(12) United States Patent
Dizengof

(10) Patent No.: US 11,909,914 B2
(45) Date of Patent: Feb. 20, 2024

(54) FORWARDING EMERGENCY MESSAGES FROM IOT DEVICES TO PSAPS

(71) Applicant: Carbyne Ltd., Tel-Aviv (IL)

(72) Inventor: Alexander Dizengof, Ashdod (IL)

(73) Assignee: Carbyne Ltd., Tel-Aviv (IL)

( * ) Notice: Subject to any disclaimer, the term of this patent is extended or adjusted under 35 U.S.C. 154(b) by 177 days.

(21) Appl. No.: 17/543,889

(22) Filed: Dec. 7, 2021

(65) Prior Publication Data

US 2023/0179706 A1 Jun. 8, 2023

(51) Int. Cl.
*H04M 3/51* (2006.01)
*H04M 3/42* (2006.01)

(52) U.S. Cl.
CPC ..... *H04M 3/5116* (2013.01); *H04M 3/42059* (2013.01)

(58) Field of Classification Search
CPC .......... H04M 3/5116; H04M 3/42059; H04M 3/42348; H04M 11/04; H04M 3/42042; H04M 3/42357; H04M 7/006; H04M 7/0057; H04M 2242/04; H04M 2242/30; H04W 4/90; H04W 76/50; H04W 4/02; H04W 4/029; H04W 4/70; H04W 4/021; H04W 4/025; H04W 4/80; H04W 80/04; H04W 64/00; H04W 76/15; H04W 12/63
See application file for complete search history.

(56) References Cited

U.S. PATENT DOCUMENTS

| | | | |
|---|---|---|---|
| 10,375,558 B2 * | 8/2019 | Katz | H04M 3/4217 |
| 10,582,343 B1 * | 3/2020 | Patton | H04W 4/90 |
| 11,394,827 B1 * | 7/2022 | Manzanillo | H04M 3/5116 |
| 11,445,349 B2 * | 9/2022 | Mehta | H04W 76/50 |
| 11,463,583 B1 * | 10/2022 | Manzanillo | H04M 3/5141 |
| 2017/0238129 A1 * | 8/2017 | Maier | H04W 4/029 455/404.2 |
| 2017/0318445 A1 * | 11/2017 | Kodaypak | H04W 4/90 |
| 2018/0206100 A1 * | 7/2018 | Eisner | H04W 12/02 |
| 2018/0352085 A1 * | 12/2018 | Philbin | H04L 67/146 |
| 2019/0200205 A1 * | 6/2019 | Mikan | H04W 4/90 |
| 2020/0135005 A1 * | 4/2020 | Katz | G06F 3/0482 |
| 2020/0228653 A1 * | 7/2020 | Klaban | H04W 4/90 |
| 2020/0244797 A1 * | 7/2020 | Horelik | H04L 63/0407 |
| 2020/0258606 A1 * | 8/2020 | Ferentz | G06Q 50/265 |
| 2020/0288295 A1 * | 9/2020 | Martin | H04M 3/5116 |
| 2020/0304638 A1 * | 9/2020 | Jensen | H04M 3/5116 |

(Continued)

*Primary Examiner* — Akelaw Teshale

(57) ABSTRACT

A system for routing emergency events reported by IoT devices to nearby Public Safety Answering Points (PSAPs), comprising an IoT server and a phone call server. The IoT server configured to receive emergency messages from IoT devices associated with users and distributed in a plurality of geographical regions and transmit the emergency messages indicative of emergency events relating to the associated users and comprise at least a location of the IoT devices to the phone call server which is configured to adjust call routing record(s) used by the PSTN to associate certain caller IDs with the location of the IoT devices, and initiate emergency call(s) to the PSTN using the certain caller IDs. The PSTN forwards emergency calls to PSAPs located in geographical regions nearest to the IoT devices determined based on between the location of the IoT devices and the certain caller IDs in the adjusted call routing record(s).

15 Claims, 7 Drawing Sheets

(56) References Cited

U.S. PATENT DOCUMENTS

| | | | | |
|---|---|---|---|---|
| 2020/0351623 A1* | 11/2020 | Eisner | ................... | H04W 4/80 |
| 2021/0058508 A1* | 2/2021 | Leavitt | ................. | H04M 3/242 |
| 2021/0084480 A1* | 3/2021 | Maier | ................... | H04W 4/90 |

* cited by examiner

FORWARDING EMERGENCY MESSAGES FROM IOT DEVICES TO PSAPS

FIELD AND BACKGROUND OF THE INVENTION

The present invention, in some embodiments thereof, relates to forwarding emergency messages originating from (Internet of Things) IoT devices to Public-Safety Answering Points (PSAPs), and, more specifically, but not exclusively, to forwarding each emergency message originating from a respective IoT device to a nearby PSAP which geographically nearest to the respective IoT device.

The rapid advancement and broad deployment of IoT devices for a plurality of applications, made the IoT devices a basic building block in a plurality of systems, platforms and/or services deployed for monitoring, capturing and reporting events in general and potential emergency events in particular.

Emergency messages originating from the IoT devices may be routed to one or more emergency services, PSAPs and/or the like which serving to receive incoming emergency calls reporting and/or indicating of emergency events. Such joint emergency dispatch centers are typically manned by dispatchers trained to receive the emergency calls and asses the emergency events and respond accordingly.

SUMMARY OF THE INVENTION

According to a first aspect of the present invention there is provided a system for routing emergency events reported by internet of things (IoT) devices to nearby public safety answering points (PSAPs), comprising an IoT server configured to receive, via one or more networks, a plurality of emergency messages from a plurality of IoT devices each associated with a user which are distributed in a plurality of geographical regions and a phone call server. The phone call server is configured for:
  Receiving, via one or more networks, one or more emergency messages from the IoT server. The one or more emergency messages originating from one or more of the plurality of IoT devices are indicative of respective emergency events relating to the associated users and comprise at least a location of the one or more IoT devices.
  Adjusting one or more call routing records used by a public switched telephone network (PSTN) to associate a certain caller ID with the location of the one or more IoT device extracted from the one or more emergency messages.
  Initiating an emergency call to the PSTN using the certain caller ID.
Wherein the PSTN forwards the emergency call to a PSAP located in one of the plurality of geographical regions nearest to the location of the IoT device determined based on its association with the certain caller ID in the one or more adjusted call routing records.

According to a second aspect of the present invention there is provided a computer implemented method of routing emergency events reported by internet of things (IoT) devices to nearby public safety answering points (PSAPs), comprising using one or more processors of a phone call server for:
  Receiving, via one or more networks, one or more emergency messages from an IoT server which is configured to receive, via one or more networks, a plurality of emergency messages from a plurality of IoT devices each associated with a user which are distributed in a plurality of geographical regions. The one or more emergency messages originating from one or more of the plurality of IoT devices are indicative of respective emergency event relating to users associated with the one or more IoT devices and comprise at least a location of the one or more IoT devices.
  Adjusting one or more call routing records used by a public switched telephone network (PSTN) to associate a certain caller ID with the location of the one or more IoT devices extracted from the one or more emergency messages.
  Initiating an emergency call to the PSTN using the certain caller ID.
Wherein the PSTN forwards the emergency call to a PSAP located in one of the plurality of geographical regions nearest to the location of the IoT device determined based on its association with the certain caller ID in the one or more adjusted call routing records.

According to a third aspect of the present invention there is provided a computer program product for routing emergency events reported by internet of things (IoT) devices to nearby public safety answering points (PSAPs), comprising a non-transitory medium storing thereon computer program instructions which, when executed by one or more hardware processors, cause the one or more hardware processors to:
  Receive, via one or more networks, one or more emergency messages from an IoT server, the IoT server which is configured to receive, via one or more networks, a plurality of emergency messages from a plurality of IoT devices each associated with a user which are distributed in a plurality of geographical regions. The one or more emergency messages originating from one or more of the plurality of IoT devices are indicative of respective emergency events relating to users associated with the one or more IoT devices and comprise at least a location of the one or more IoT devices.
  Adjust one or more call routing records used by a public switched telephone network (PSTN) to associate a certain caller ID with the location of the one or more IoT devices extracted from the one or more emergency messages.
  Initiate an emergency call to the PSTN using the certain caller ID.
Wherein the PSTN forwards the emergency call to a PSAP located in one of the plurality of geographical regions nearest to the location of the IoT device determined based on its association with the certain caller ID in the one or more adjusted call routing records.

In an optional implementation form of the first, second and/or third aspects, a message forwarding engine is deployed in one or more monitoring servers configured to receive and analyze data received from at least some of the plurality of IoT devices. The message forwarding engine which is communicatively coupled to the IoT server and to the phone call server via one or more networks is configured to transmit each emergency message received from the IoT server to the phone call server.

In an optional implementation form of the first, second and/or third aspects, the message forwarding engine is further configured to apply one or more ML models trained to compute a score indicative of genuineness of the one or more emergency messages, and forward the one or more emergency message to the phone call server in case the score exceeds a predefined threshold.

In an optional implementation form of the first, second and/or third aspects, the IoT server receives the one or more emergency messages from one or more other 3rd party IoT servers configured to receive one or more of the plurality of emergency messages received from one or more of the IoT devices and transmit one or more of the at least some emergency messages to the IoT server.

In an optional implementation form of the first, second and/or third aspects, the phone call server is integrated with the IoT server.

In a further implementation form of the first, second and/or third aspects, the IoT server is further configured to apply one or more ML models trained to compute a score indicative of genuineness of the one or more emergency messages, and transmit the one or more emergency messages to the phone call server in case the score exceeds a predefined threshold.

In an optional implementation form of the first, second and/or third aspects, the certain caller IDs are derived from one or more identifiers relating to the associated users which are included in the one or more emergency messages.

In a further implementation form of the first, second and/or third aspects, the one or more call routing records comprise one or more Automatic Number Identifier (ANI)/Automatic Location Identification (ALI) databases.

In a further implementation form of the first, second and/or third aspects, the emergency call is a voice call.

In a further implementation form of the first, second and/or third aspects, the emergency call further comprises text transmitted to the PSTN according to one or more protocols defining transmittal of text via voice lines.

In an optional implementation form of the first, second and/or third aspects, the one or more emergency messages comprise one or more event attributes descriptive of the respective emergency event.

In a further implementation form of the first, second and/or third aspects, the one or more event attributes are included in the one or more emergency messages by the IoT server.

In an optional implementation form of the first, second and/or third aspects, the phone call server is further configured to adjust the one or more call routing records to associate the certain caller ID with the one or more event attributes included in the one or more emergency message. Wherein while forwarding the emergency call to the PSAP, the PSTN further transmits to the PSAP the one or more event attributes extracted from the one or more call routing records.

In an optional implementation form of the first, second and/or third aspects, the IoT server is further configured to include in the one or more emergency messages one or more hyperlinks pointing to one or more network resources comprising additional event data relating to the respective emergency event. The phone call server is further configured to adjust the one or more call routing records to associate the certain caller ID with the one or more hyperlinks such that the PSTN transmits to the PSAP the one or more hyperlinks extracted from the one or more call routing records. The one or more hyperlinks are used at the PSAP to connect to the one or more network resources in order to retrieve the additional event data.

In a further implementation form of the first, second and/or third aspects, the additional event data comprises one or more data items which are members of group comprising at least: a geolocation of the one or more IoT device, an image captured by the one or more IoT devices, a video sequence captured by the one or more IoT devices, an audio clip captured by the one or more IoT devices, one or more vital sign readings of the associated user captured by the one or more IoT devices, and a message generated by the associated user.

In a further implementation form of the first, second and/or third aspects, each of the plurality of IoT devices is a member of a group consisting of: a client device of the associated user, a wearable IoT device wearable by the associated user, a vehicular IoT device deployed in a vehicle used by the by the associated user, and an IoT device deployed in a site associated with the associated user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
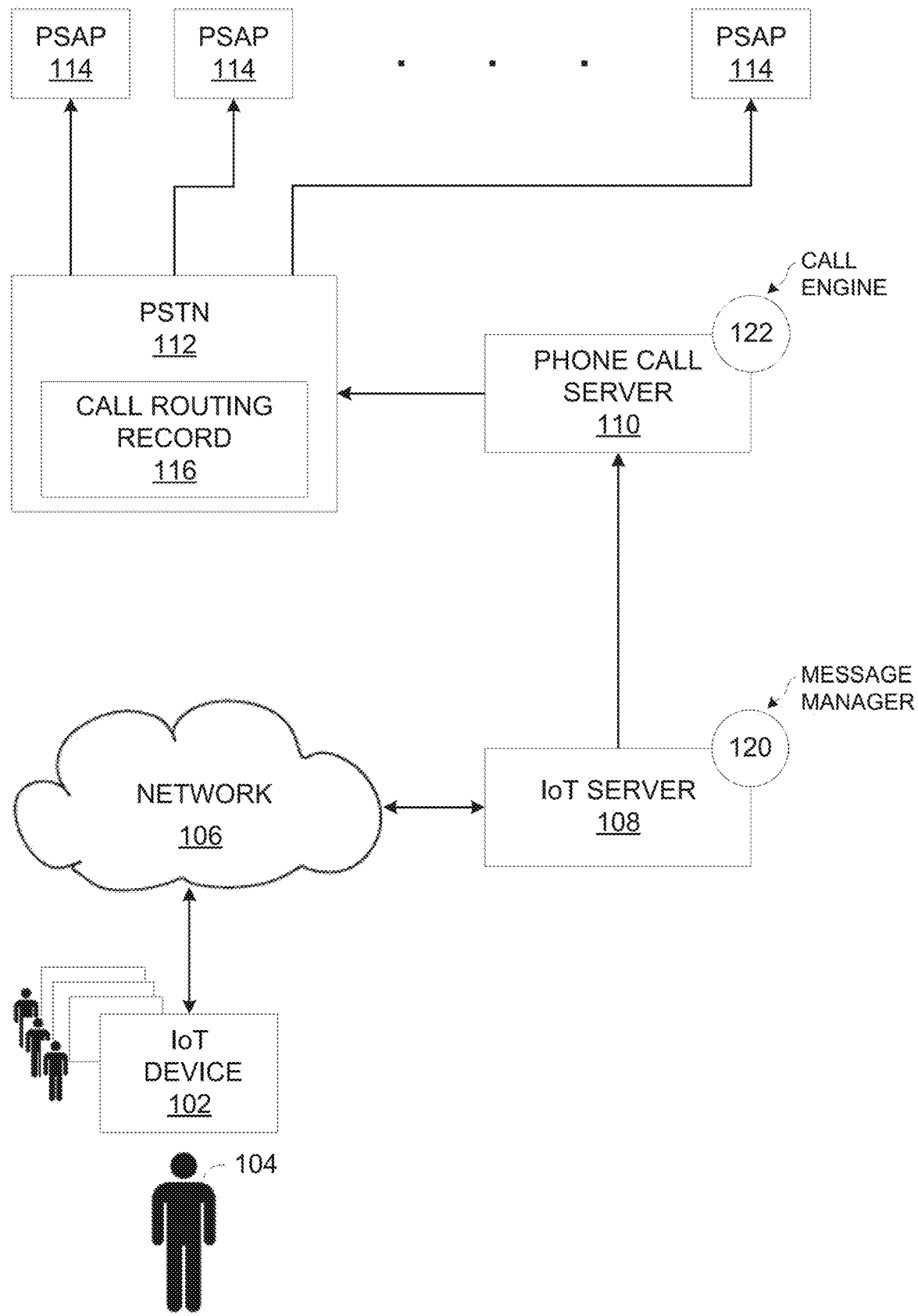
FIG. 1A, FIG. 1B and FIG. 1C are schematic illustrations of exemplary systems for forwarding emergency messages originating from IoT devices to nearby PSAPs, according to some embodiments of the present invention.

The present invention, in some embodiments thereof, relates to forwarding emergency messages originating from IoT devices to PSAPs, and, more specifically, but not exclusively, to forwarding each emergency message originating from a respective IoT device to a nearby PSAP which geographically nearest to the respective IoT device.

IoT devices have become major components in systems, platforms and/or services deployed for monitoring, capturing and reporting emergency events, for example, medical situations (e.g. heart-attack, fainting, sugar drop, hard fall, etc.), car accidents, violence incidents (premises break-in, kidnap, fight, rape, firearms incident, etc.), nature inflicted emergency situations and/or the like.

The IoT devices may be physically coupled to associated users, for example, wearable devices, carried devices and/or the like, for example, smartphones, tablets, Smartwatches, wearable health monitoring devices, wearable sports devices and/or the like. However, the IoT devices may also include vehicular devices deployed in vehicles of the associated users and/or statically deployed in sites and/or properties of the associated users.

The IoT device may be therefore highly useful for monitoring and transmitting emergency messages reporting of emergency events and/or potential emergency events involving the associated users.

Such emergency events should be naturally reported to PSAPs, in particular to nearby PSAPs deployed in close proximity to the emergency event scene (site) for efficient handling and response. The IoT devices, however, may typically be connected via one or more networks to remote monitoring centers, servers, systems and/or services, often cloud services which may not be in close proximity to the reporting IoT devices and may often be located in a different and remote geographical location.

This limitation may present a major challenge for reporting emergency events detected by IoT devices to nearby PSAPs located nearest the emergency event scene (site), in particular legacy PSAPs which may receive emergency calls over the Public Switched Telephone Network (PSTN).

The monitoring center(s) receiving the emergency messages from the IoT devices may initiate corresponding emergency (phone) calls to one or more emergency lines (e.g., 911 in US, 112 in Europe, etc.) to report the emergency events indicated in the emergency messages. However, these emergency calls may be routed and/or directed to PSAPs located near the reporting monitoring center which may be located in a geographical location which, as stated before, may be very distant from the location of the IoT device and hence from the location of the emergency event scene.

Naturally, directing the emergency calls to distant PSAPs may be highly inefficient and may significantly increase response time which in many cases may be crucial and may lead to increased, damage, injury and/or even casualties.

According to some embodiments of the present invention, there are provided methods, systems and computer program products for forwarding emergency messages originating from IoT devices to PSAPs, specifically to nearby PSAPs located in close geographical distance to the originating IoT devices.

The IoT devices may be configured to transmit emergency messages indicative of an emergency events via one or more networks including the internet to a remote IoT server which may be optionally implemented using one or more cloud services. Each of the emergency messages may include at least a location, for example, a geolocation, a geographical area, a region, an address and/or the like of the originating IoT device. The location may be typically inserted in the emergency message by the reporting IoT device which may be aware of its location, for example, based on data received from one or more location sensors (e.g. GPS) or the location may be predefined, specifically for statically deployed IoT devices.

Optionally, one or more of the emergency messages may further include one or more event attributes relating to the emergency event (e.g. type of event, exact geolocation, details, etc.), relating to the associated user(s) (e.g. name, age, medical status, etc.) and/or the like. One or more of the emergency messages may also include one or more data items captured at the emergency event site, for example, an image, a video sequence, an audio clip (e.g., sound, speech, combination thereof), and/or the like.

According to some embodiments, one or more of the IoT devices may be configured to transmit the emergency messages to one or more $3^{rd}$ party IoT servers and/or services. In such embodiments the emergency messages may be forwarded from the $3^{rd}$ party IoT services to the IoT server.

Optionally, the IoT server may include in one or more of the emergency messages one or more additional event attributes retrieved from account(s) of the associated user(s). Optionally, the IoT server may remove one or more of the event attributes and/or data items included in one or more of the emergency messages by the respective IoT devices.

Optionally, the IoT server may validate one or more of the emergency messages to verify whether the emergency messages are real, authentic, genuine, correct and/or accurate, collectively designated genuine herein after. The IoT server may apply one or more, methods, techniques and/or algorithms for verifying genuineness of the emergency messages, for example, based on one or more patterns of the associated users, for example, activity patterns, mobility patterns, timing patterns and/or the like. In another example, the IoT server may verify whether the emergency messages are genuine based on correlation with other emergency messages received from other IoT devices reporting on the same emergency events. Optionally, the IoT server may apply one or more trained Machine Learning (ML) models to verify whether the emergency messages are genuine.

The IoT server may be configured to transmit the received emergency messages to a phone call server configured to initiate emergency phone calls (voice and/or data calls) corresponding to the emergency messages to the PSTN which may route the emergency calls to one or more PSAPs.

According to some embodiments, the IoT server may transmit one or more of the emergency messages to one or more monitoring centers in which human and/or automated dispatchers may be stationed and/or deployed to manage messages received from one or more of the IoT devices. In such embodiments the emergency messages may be forwarded from the monitoring center(s) to the phone call server.

The phone call server may be configured to first adjust one or more call routing records, for example, a database, a list, a table, a file and/or the like such as for example, an Automatic Number Identifier/Automatic Location Identification (ANI/ALI) database used by the PSTN for routing phone calls, in particular emergency calls.

For each emergency message originating from a respective IoT device, before initiating a corresponding respective emergency call, the phone call server may adjust the call routing record(s) to associate a respective caller identifier (ID) (e.g. phone number) to be used for the respective emergency call with the location of the respective IoT device, for example, an area code, a geographical location or region, a geolocation and/or the like. After adjusting the call routing record(s), the phone call server may initiate the respective emergency call to the PSTN using the respective caller ID.

When receiving each incoming emergency call from the phone call server, the PSTN may identify the respective emergency call by its respective caller ID and may access the call routing table(s) to determine the location of origin of the respective emergency call. Since the adjusted call routing table(s) associates the respective caller ID with the location of the respective IoT device, the location of origin of the respective emergency determined by the PSTN is actually the location of the respective IoT device. The PSTN, identifying the location of origin of the respective IoT device may therefore route the respective emergency call to a nearby one of the PSAPs that is located nearest to the location of the IoT device, i.e. a PSAP from which a distance to the IoT device is the shortest among all PSAPs.

Forwarding emergency messages to nearby PSAPs by adjusting the call routing record(s) used by the PSTN may present major benefits and advantages over currently existing systems and methods for forwarding emergency messages.

First, deploying the phone call server to adjust the routing record(s) of the PSTN may enable routing of emergency (phone) call corresponding to emergency messages originating from IoT devices to legacy PSAPs located nearby the originating IoT devices regardless of where the phone call server is actually located. Handling and responding to the emergency messages from the nearby PSAPs may be therefore significantly more efficient, more rapid and/or more accurate compared to most if not all currently existing IoT services which are deployed remotely from the IoT devices and may be unable to initiate corresponding emergency calls to legacy PSAPs located nearby the originating IoT devices.

Moreover, analyzing the emergency messages to determine whether they are genuine or not may enable filtering false emergency messages which may be erroneously initiated by one or more of the IoT devices thus significantly reducing false positive indications of emergency events. This may significantly reduce, effort, resources and/or cost consumed by redundant and/or futile response to such false emergency events.

Furthermore, enriching at least some of the emergency messages to include event attributes relating to the emergency event, for example, emergency event type (e.g. car accident, home intrusion, medical seizure, etc.), exact geolocation, event details (e.g. airbag opened, high speed collision, home alert device activation, etc.) may significantly improve perception of the emergency event by human and/or automated dispatchers. The dispatchers having a more detailed, extensive and/or broad understanding of the emergency event may better respond to the emergency event with respect to the type of response (e.g. police, medical assistance, fire department, etc.), size of emergency force to be sent and/or the like.

Also, enriching at least some of the emergency messages to further include additional data items captured at the emergency event site (e.g. image(s), video sequence(s), audio clip(s) (e.g., sound, speech, combination thereof), etc.) may further improve perception of the emergency event by the dispatchers which may lead to a further improved response to the emergency event.

In addition, a plurality of monitoring services may be provided by already deployed monitoring centers. Therefore, adjusting the message forwarding system to support the existing monitoring centers may take advantage of the resources available at the monitoring centers, for example, monitoring personnel and/or automated systems configured to handle, analyze and optionally respond to messages received from at least some of the IoT devices. Moreover, supporting the monitoring centers may increase deployment opportunities of the adjusted message forwarding system, increase its acceptance by existing services and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
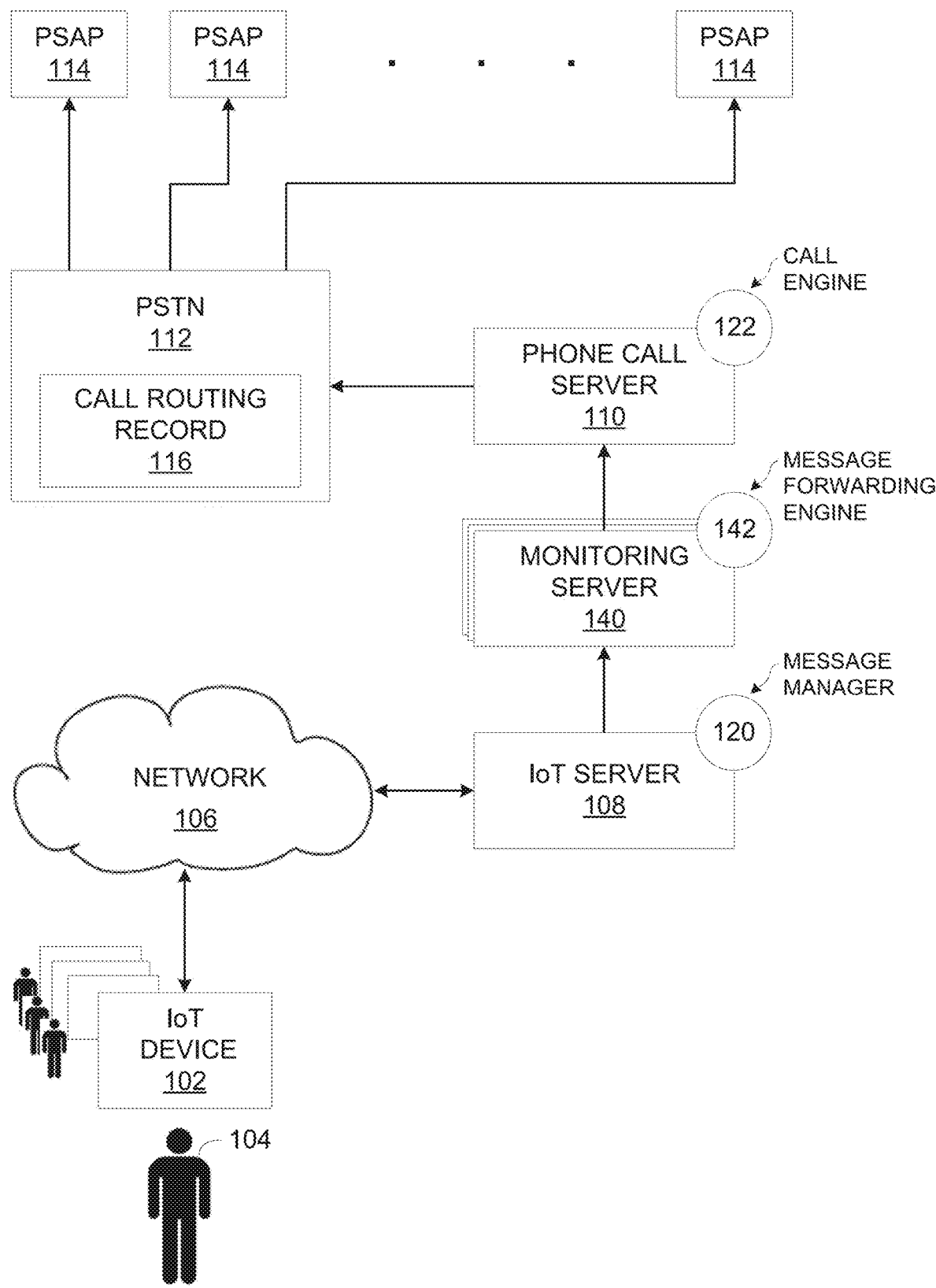
Figure 1C:
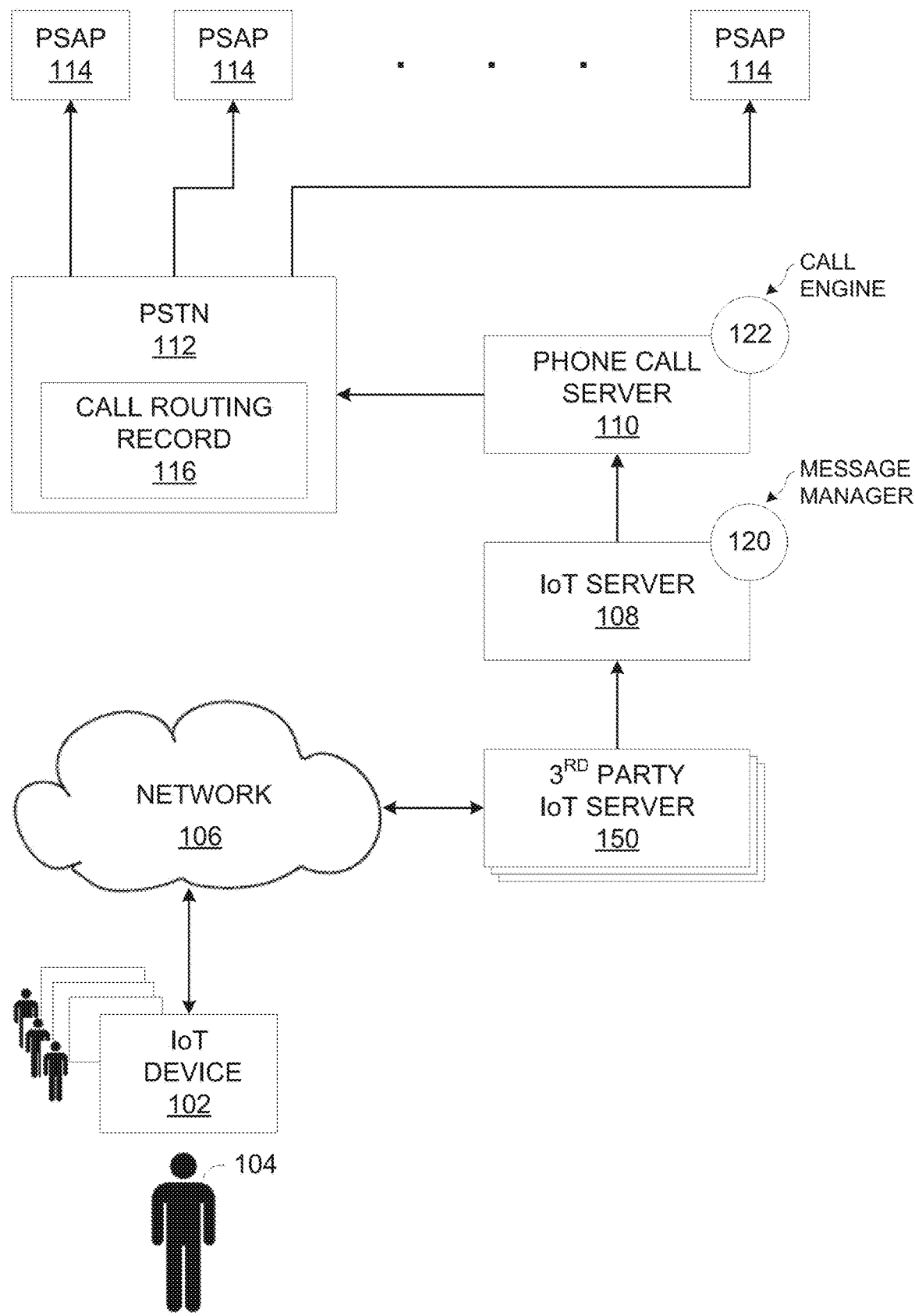

Referring now to the drawings, FIG. 1A, FIG. 1B and FIG. 1C are schematic illustrations of exemplary systems for forwarding emergency messages originating from IoT devices to nearby PSAPs, according to some embodiments of the present invention.

As seen in FIG. 1A, one or more IoT devices 102 which may be each associated with one or more users 104 may be located with their associated user(s) 104 and/or located at one or more sites associated with the associated user(s) 104.

The IoT devices 102 may include one or more private and/or personal IoT devices 102 which are carried, held, used, worn and/or otherwise physically coupled to the respective user 104. Such private IoT device 102 may include, for example, a client device of the associated user 104 such as, for example, a smartphone, a tablet and/or the like. In another example, the private IoT device 102 may include one or more wearable devices and/or sensors worn by the associated user 104, for example, a Smartwatch, a Wearable Health Device (WHD) configured to monitor one or more vital signs of the associated user 104 (e.g. heartbeat, breathing, blood pressure, oxygen level in the blood, etc.), a sports wearable device and/or the like.

However, the IoT devices 102 may further include one or more IoT devices which may be physically coupled to the associated user 104 but may be rather deployed in one or more locations, properties, vehicles and/or the like of the associated user 104 which may include multiple associated users 104, for example, multiple family members, office members, etc. Such IoT devices 102 may include, for example, one or more vehicular IoT devices 102 deployed in one or more vehicles of the associated user(s) 104 and/or used by the associated user(s) 104, for example, a vehicular system, a vehicular sensor and/or the like. In another example, these IoT devices 102 may include one or more IoT devices 102 deployed in one or more sites associated with the associated user 104, for example, a residence, an office, a property and/or the like.

Each of the IoT devices 102 may be aware of its current location. For example, one or more of the IoT devices 102 physically coupled to its associated user 104 may receive, fetch, and/or otherwise obtain current geolocation of the associated user 104 from one or more geolocation sensors (e.g. GPS, WLAN positioning, etc.) which may be integrated in the respective IoT device 102 and/or extremal and disparate from the respective IoT device 102. In another example, one or more of the IoT devices 102, specifically statically deployed IoT devices 102 such as the IoT device(s) 102 deployed in a site associated with the associated user(s) 104 may have a predefined geolocation.

Each of the IoT devices 102 may comprise one or more wired and/or wireless network interfaces may connect a network 106 comprising one or more wired and/or wireless networks, for example, a Local Area Network (LAN), a Wireless LAN (WLAN), a Wide Area Network (WAN), a Municipal Area Network (MAN), a landline telephone network, the internet and/or the like. Via the network 106, each of the IoT devices 102 may communicate with one or more remote networked resources connected to the network 106.

In particular, each of the IoT devices 102 may communicate with an IoT server 108 configured to receive one or more messages from the IoT devices 102, specifically emergency messages indicative of one or more emergency events relating to one or more of the associated users 104.

The IoT server 108 may be further configured to transmit one or more of the emergency messages received from the IoT devices 102 to a phone call server 110. While for brevity, the IoT server 108 is illustrated to directly connect to the phone call server 110, the IoT server 108 may communicate with the phone call server 110 via the network 106.

The phone call server 110 may be configured to initiate one or more phone calls to one or more destinations via a PSTN 112. Specifically, the phone call server 110 may be configured to initiate one or more emergency phone calls to one or more PSAPs 114 where the emergency phone calls may be received, handled and/or dispatched to one or more emergency forces responding to the emergency events.

The PSTN 112 may typically route phone calls between initiating parties, for example, the phone call server 110 and destination parties, for example, the PSAPs 114 according to one or more call routing records 116, for example, an ANI/ALI database and/or service and/or the like. The call routing record(s) may associate caller IDs, for example, phone numbers, user names, user IDs and/or the like with locations, for example, geographical regions, area codes and/or the like.

When receiving an incoming phone call, the PSTN 112 may identify and/or extract the caller ID of the incoming phone call, look up the location associated in the call routing table(s) with the caller ID of the incoming phone call and route the phone call accordingly to a destination party according to one or more call routing protocols as known in the art.

Figure 2:
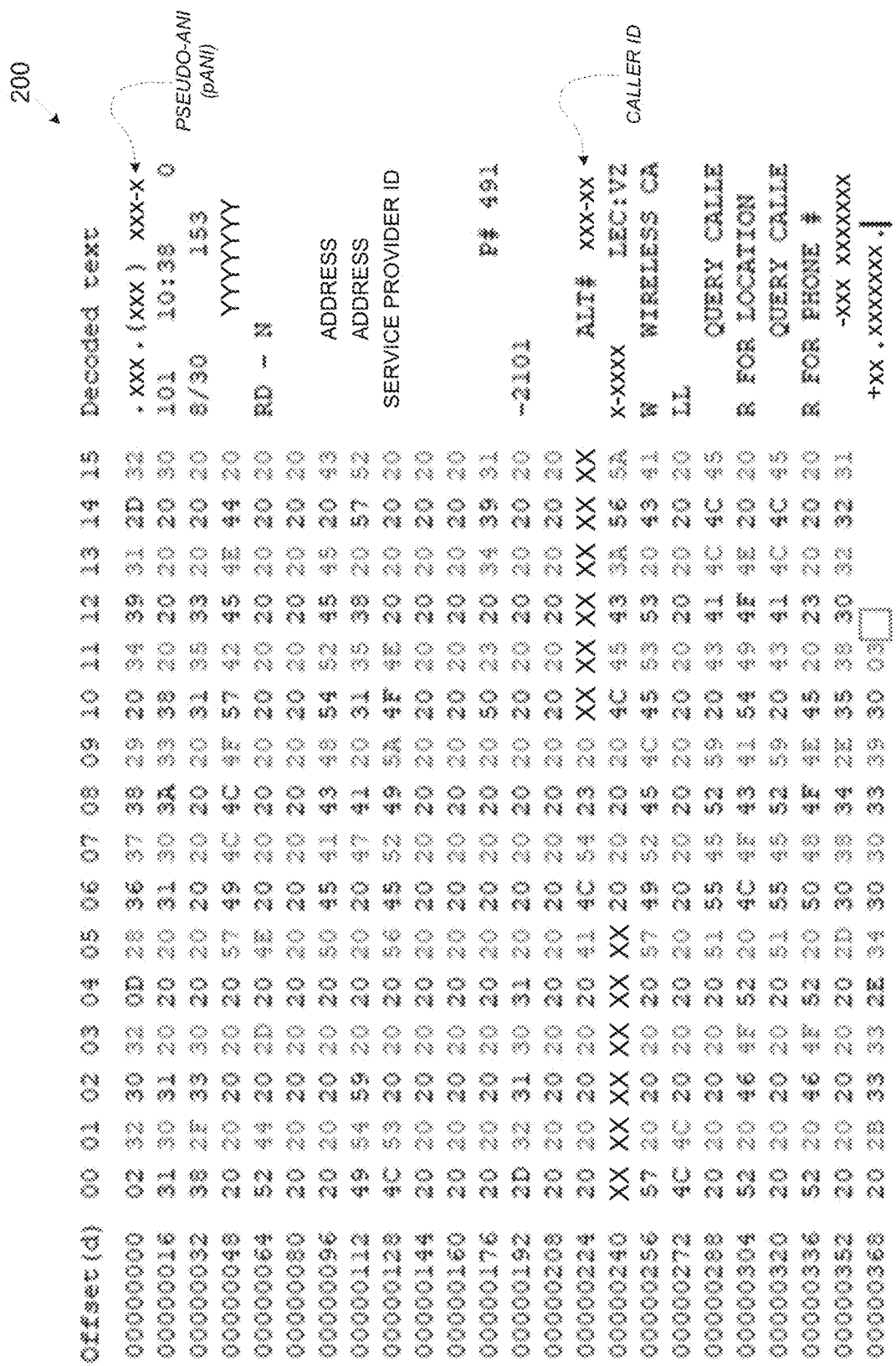
FIG. 2 and FIG. 3 are schematic illustrations of exemplary ANI/ALI data format.
Figure 3:
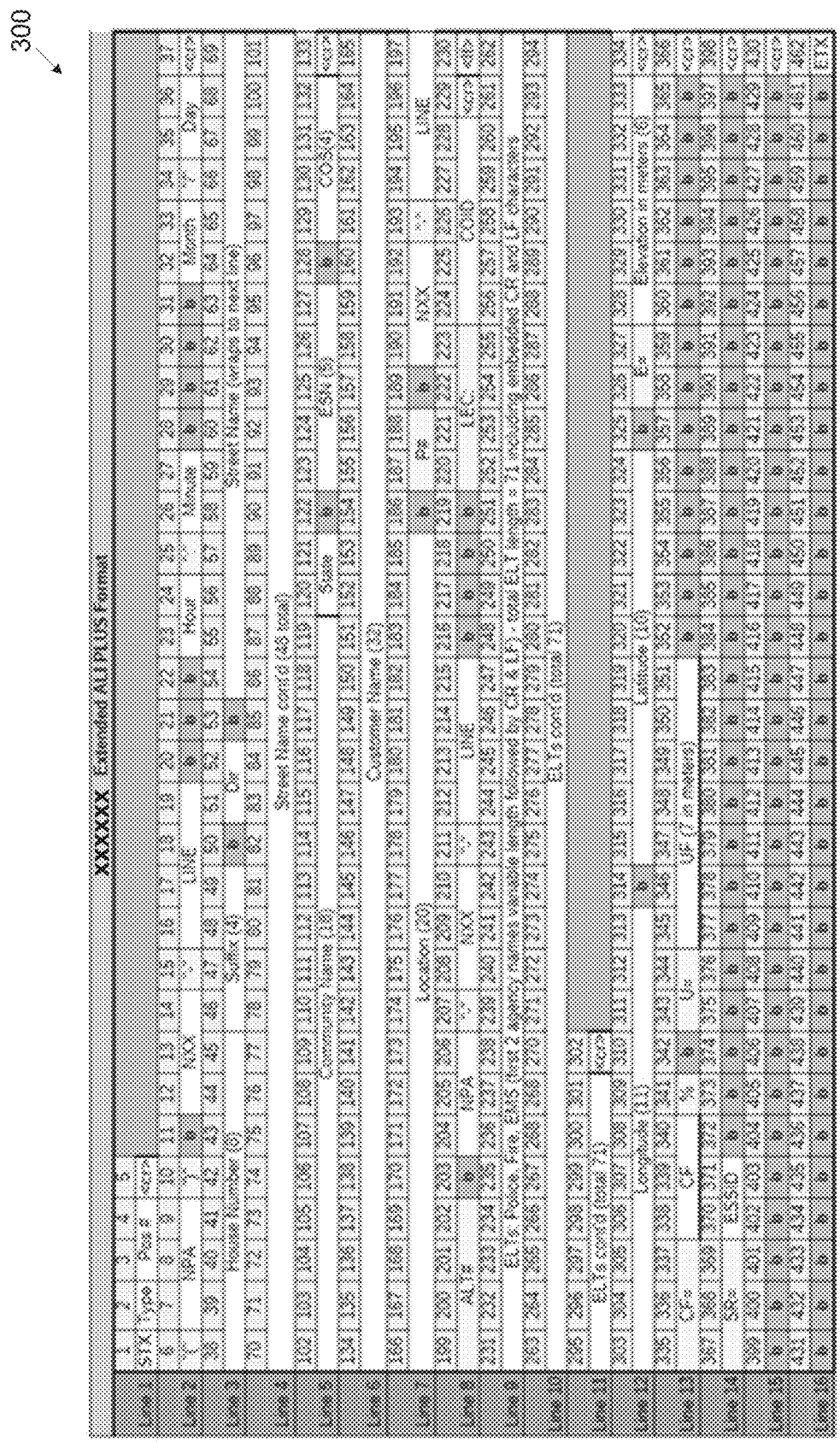

Reference is now made to FIG. 2 and FIG. 3, which are schematic illustrations of exemplary ANI/ALI data format. An exemplary data block 200 includes at least part of data of a certain incoming phone call. As seen, the raw data block 200 presented in HEX format may include one or more of the attributes identified for the certain incoming phone call, for example, a Pseudo-ANI (pANI) determined for the certain incoming call, a caller ID (including area code), a service provider, a type of the call (e.g., landline, cellular), timing attributes of the certain incoming phone call (e.g., hour, minute, month, day, etc.) and/or the like extracted from the certain incoming phone call and optionally retrieved from the ANI/Ali database.

An exemplary ANI-ALI database entry 300 relating to the caller ID extracted from the certain incoming phone call may include a plurality of attribute fields as known in the art, for example, location attributes (e.g. house number, street name, etc.), geolocation attributes (e.g. longitude, latitude, elevation, etc.), Event Liaison Team (ELT) attributes (e.g. Police, Fire, EMS, etc.) and/or the like.

Reference is made once again to FIG. 1A, FIG. 1B and FIG. 1C.

The IoT server 108 may comprise one or more network interfaces for connecting to the network 106, one or more processors and a storage. The processor(s), homogenous or heterogeneous, may include one or more processing nodes and/or cores arranged for parallel processing, as clusters and/or as one or more multi core processor(s). The storage may comprise one or more non-transitory persistent storage devices such as, for example, a ROM, a Flash array, a Solid State Drive (SSD), a Hard Drive (HDD) and/or the like and optionally one or more volatile devices such as, for example, a RAM component, a cache and/or the like. The storage may further comprise one or more network storage devices, for example, a storage server, a Network Accessible Storage (NAS), a network drive, a database server and/or the like accessible through the network interface of the IoT server 108.

The processor(s) of the IoT server 108 may execute one or more software modules such as, for example, a process, a script, an application, an agent, a utility, a tool, an Operating System (OS) and/or the like each comprising a plurality of program instructions stored in a non-transitory storage medium (program store) such as the storage of the IoT server 108. The processor(s) may further, integrate, utilize and/or facilitate one or more hardware elements (modules) integrated and/or utilized in the IoT server 108, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) of the IoT server 108 may therefore execute one or more functional modules implemented using one or more software modules, one or more of the hardware modules and/or combination thereof, for example, a message manager 120 for receiving one or more emergency messages from one or more of the IoT devices 102 and transmitting the received emergency message(s) to the phone call server 110.

Optionally, the IoT server 108 and/or the message manager 120 may be implemented using one or more cloud based computing services, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

Similarly, the phone call server 110 may comprise one or more network interfaces for connecting to the network 106, one or more processors and a storage. The processor(s), homogenous or heterogeneous, may include one or more processing nodes and/or cores arranged for parallel processing, as clusters and/or as one or more multi core processor(s). The storage may comprise one or more non-transitory persistent storage devices such as, for example, a ROM, a Flash array, an SSD, an HDD and/or the like and optionally one or more volatile devices such as, for example, a RAM component, a cache and/or the like. The storage may further comprise one or more network storage devices, for example, a storage server, a NAS, a network drive, a database server and/or the like accessible through the network interface of the phone call server 110.

The processor(s) of the phone call server 110 may execute one or more software modules such as, for example, a process, a script, an application, an agent, a utility, a tool, an OS and/or the like each comprising a plurality of program instructions stored in a non-transitory storage medium (program store) such as the storage of the phone call server 110. The processor(s) may further, integrate, utilize and/or facilitate one or more hardware elements (modules) integrated and/or utilized in the phone call server 110, for example, a circuit, a component, an IC, an ASIC, an FPGA, a DSP, a GPU, an AI accelerator and/or the like.

The processor(s) of the phone call server 110 may therefore execute one or more functional modules implemented using one or more software modules, one or more of the hardware modules and/or combination thereof, for example, a call engine 122 for receiving one or more emergency messages from the IoT server 108 and initiating one or more corresponding phone calls to one or more of the PSAPs 114 via the PSTN 112.

Optionally, the phone call server 110 and/or the call engine 122 may be implemented using one or more cloud based computing services, for example, IaaS, PaaS, SaaS and/or the like such as, for example, AWS, Google Cloud, Microsoft Azure and/or the like.

Optionally, the IoT server 108 and the phone call server 110 may be integrated together in a single server and/or a single service, for example, a cloud based service.

Optionally, as seen in FIG. 1B, the IoT server 108 may transmit one or more of the emergency messages received from one or more of the IoT devices 102 to one or more monitoring servers 142 deployed in one or more monitoring centers which may forward one or more of the received emergency messages to the phone call server 110. The monitoring server(s) 142 may communicate with the IoT server 108 and with the phone call server 110 via the network 106.

Each monitoring center may include one or more automated systems and/or human operators and/or dispatchers which may receive and analyze the emergency messages and decide whether to take one or more actions in response to the emergency messages before forwarding them to the phone call server 110. For example, one or more of the received emergency messages may be analyzed to determine whether they are real, genuine, valid, correct and/or accurate. In another example, one or more of the received emergency messages may be analyzed to determine their type, class, priority and/or the like.

Each monitoring server 142 may execute a message forwarding engine 142 configured to receive and optionally analyze one or more of the emergency messages received from the IoT server 108 and further transmit one or more of the received emergency messages to the phone call server 110.

Optionally, as seen in FIG. 1C, the IoT server 108 may receive one or more of the emergency messages from one or more $3^{rd}$ party IoT servers 150 rather than directly from one or more of the IoT devices 102 themselves. The $3^{rd}$ party IoT server(s) 150 may communicate with the IoT devices 102 and with the via the network 106.

Specifically, one or more of the IoT devices 102 may be configured to communicate with one or more of the $3^{rd}$ party IoT server(s) 150 and may thus be unable to transmit their emergency messages to the IoT server 108. In order to overcome this, the $3^{rd}$ party IoT server(s) 150 may be configured to transmit (forward) one or more messages received from such IoT devices 102, specifically emergency messages to the IoT server 108.

The $3^{rd}$ party IoT server(s) 150 may be therefore configured and/or updated to add this functionality. For example, one or more settings, routing tables and/or the like may be adjusted in the $3^{rd}$ party IoT server(s) 150 to define transmitting the emergency messages originating from one or more of the IoT devices 102 to the IoT server 108. In another example, one or more software modules may be deployed in the $3^{rd}$ party IoT server(s) 150 for transmitting emergency messages to the IoT server 108.

Moreover, the $3^{rd}$ party IoT server(s) 150 may optionally handle one or more other types of messages (i.e., not emergency messages) received from the IoT devices 102 and transmit the emergency messages to the IoT server 108.

Figure 4:
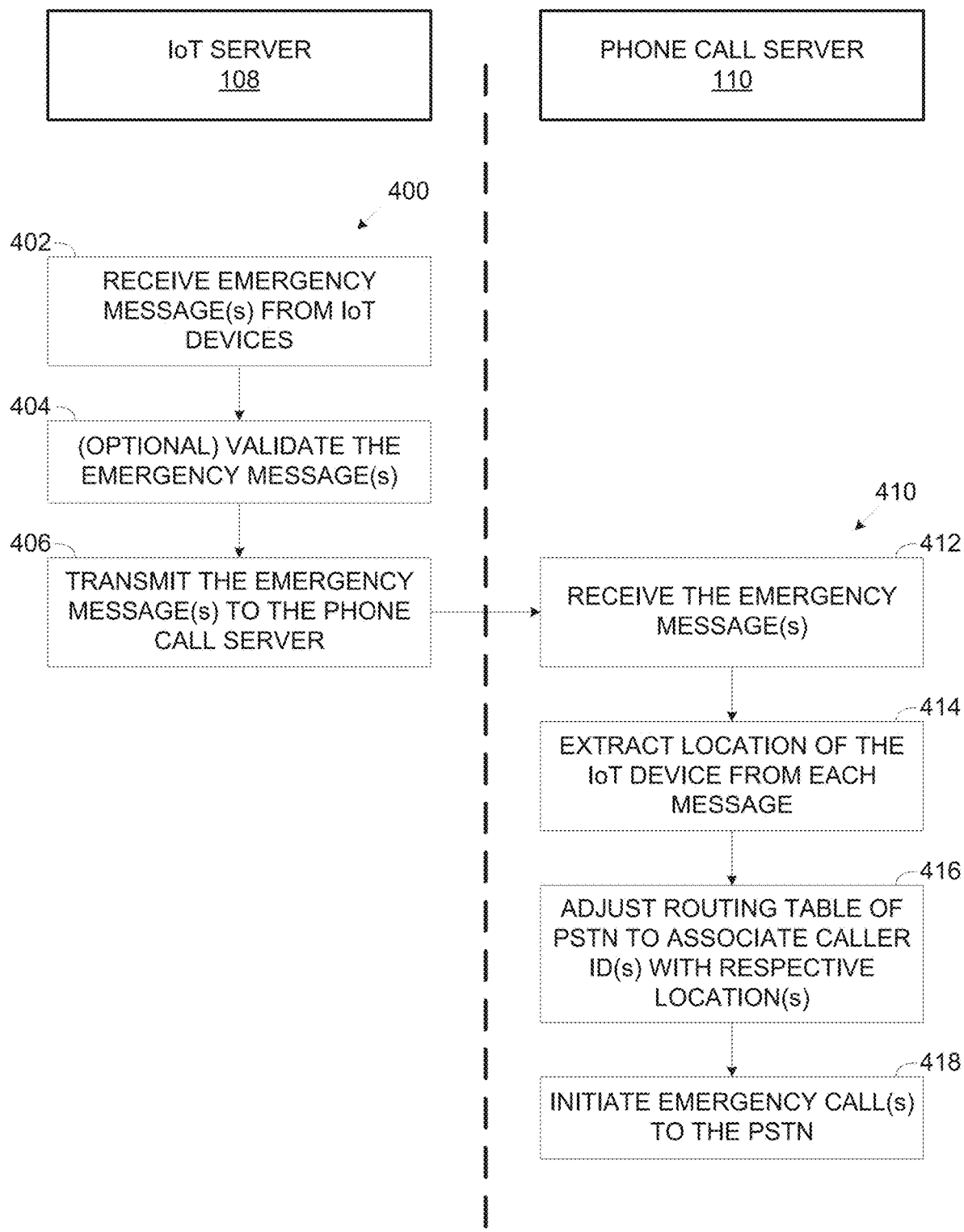
FIG. 4 presents flowcharts of exemplary processes executed to forward emergency messages originating from IoT devices to nearby PSAPs, according to some embodiments of the present invention.

Reference is now made to FIG. 4, which presents flowcharts of exemplary processes executed to forward emergency messages originating from IoT devices to nearby PSAPs, according to some embodiments of the present invention.

An exemplary process 400 may be executed by an IoT server such as the IoT server 108, specifically by a message manager such as the message manager 120 for transmitting (forwarding) one or more emergency messages received from one or more IoT devices such as the IoT devices 102 to a phone call server such as the phone call server 110.

An exemplary process 410 may be executed by the phone call server 110, specifically by a call engine such as the call engine 122 for adjusting, in response to receiving each emergency message, one or more routing tables such as the routing table 116 used by a PSTN such as the PSTN 112 to associate caller IDs with locations of originating IoT devices 102 and initiating emergency phone calls using the caller IDs such that the PSTN may route the emergency phone calls to nearby PSAPs such as the PSAPs 114 located nearest to the originating IoT devices 102.

For brevity the processes 400 and 410 are presented for receiving a single emergency message originating from a single IoT device 102 and initiating a single corresponding emergency call to a single nearby PSAP 114 located nearest to the single IoT device 102. This, however, should not be construed as limiting since the processes 400 and 410 may be expanded (duplicated) to receive a plurality of emergency messages originating from a plurality of IoT devices 102 located in a plurality of geographical locations and initiate corresponding emergency call to a plurality of PSAPs 114 each located nearest to one or more respective IoT devices 102.

As shown at 402, the process 400 starts with the IoT server 108, specifically the message manager 120 receiving an emergency message from one of the plurality of IoT devices 102.

Optionally, in case of the deployment described in FIG. 1C, the message manager 120 may receive the emergency message from a $3^{rd}$ party IoT servers such as the $3^{rd}$ party IoT server 150 configured to receive messages from the originating IoT device 102.

The emergency message which is indicative of an emergency event relating to one or more of the users 104 associated with the IoT device 102 may include at least a geolocation of the IoT device 102. As described herein before, the IoT device 102 may be aware of its location either based on geolocation data received from one or more geolocation sensors for a mobile IoT device 102 and/or based on predefined geolocation for a statically deployed IoT device 102. The geolocation of the IoT device 102 may be the location of the associated user 104 in case the IoT device 102 is physically coupled to the associated device and/or deployed in a vehicle used by the associated user 104 or in case the IoT device 102 is statically deployed in a site associated with the user 104, the geolocation may be the location of the site and/or a location within the site.

While the emergency event indication may be general, the emergency message may include one or more additional message attributes relating to the emergency event, for example, timing attributes (e.g. time of event, duration, etc.), emergency event attribute(s) and/or the like.

The event attributes may further describe the emergency event and/or provide additional data which may be highly useful for one or more dispatchers, personnel, services and/or the like responding to the emergency event.

The event attributes may relate to the emergency event itself. For example, a certain IoT device 102 for example, a wearable health monitoring device worn by the associated user 104 may transmit, in case of a medical emergency event, an emergency message comprising event attribute(s) indicating a health emergency event, for example, a heart attack, a severe sugar level drop, a passing-out and/or the like experienced by the associated user 104. In another example, a certain IoT device 102 for example, a Smartwatch worn by the associated user 104 and comprising one or more motion sensors, for example, a gyroscope, an accelerometer, and/or the like may transmit, in case the associated user falls, an emergency message comprising event attribute(s) indicating a potential hard fall of the associated user 104. In another example, a certain vehicular IoT device 102 deployed in a vehicle used by the associated user 104 may transmit, in case of an accident, an emergency message comprising event attribute(s) indicating that the vehicle is involved in an accident. In another example, a certain IoT device 102 deployed in a residence of the associated user 104, for example, an imaging sensor may transmit an emergency message comprising event attribute(s) indicating that the associated user 104 is experiencing a medical situation, a fall and/or the like. In another example, a certain IoT device 102 deployed in an office of the associated user 104, for example, an imaging sensor may transmit, in case of an emergency event taking place at the office, an emergency message comprising event attribute(s) indicating a fire, a break-in (e.g., burglary, unauthorized entry, etc.), a water flood and/or the like in the office.

The event attributes may also relate to the associated user 104 and may include, for example, a user identifier of the associated user 104, for example, a name, an ID number, a phone number, an account (subscription) number, a user name, account credentials and/or the like. In another example, the event attributes relating to the associated user 104 may include, an age, medical condition, known health issues, blood type, physical dimensions (e.g., weight, height, etc.) and/or the like. In another example, the event attributes may include information relating to the number of associated users 104 and/or the number of people involved in the emergency event. For example, a certain vehicular IoT device 102 deployed in a vehicle in which several family members of the associated user 104 travel may transmit, in case of a car accident the vehicle is involved in, an emergency message comprising event attribute(s) indicating the number of passengers in the vehicle.

Optionally, the emergency message may include one or more data items relating to the emergency event, for example, a geolocation of the IoT device 102 (e.g., an accurate geolocation), an image captured by the IoT device 102, a video sequence captured by the IoT device 102, an audio clip (e.g., sound, speech, combination thereof) captured by the IoT device 102, vital signs readings of the associated user 104 captured by the IoT device 102 and/or the like. The data item(s) may further include one or more messages created and/or generated by the associated user 104, for example, a written text, a voice message, a video clip, and/or the like.

As shown at 404, the message manager 120 may optionally analyze the received emergency message in attempt to validate and/or verify whether the message is real, authentic, genuine, correct and/or accurate, collectively designated genuine herein after. The message manager 120 may further compute a score indicative of genuineness of the at least one emergency message.

The message manager 120 may apply one or more methods, techniques and/or algorithms to analyze the emergency message and evaluate, predict and/or determine if it is genuine based on one or more of the message attributes of the received emergency message, for example, geolocation attribute(s), timing attribute(s), event attribute(s) and/or the like.

For example, the message manager 120 may validate the emergency message based on one or more unique keys, specifically cryptographic keys as known in the art, for example, private/public key pairs, symmetric keys and/or the like uniquely associated with the originating IoT device 102 and/or with the associated user 104. In such case, the originating IoT device 102 may sign the emergency message using the key uniquely associated with the IoT device and/or the associated user 104. The message manager 120 may therefore validate the signature to verify the emergency message originates from the claimed IoT device 102. In case of successful signature validation, the message manager 120 may determine and/or estimate that the emergency message is genuine and may optionally compute a high score for it. However, in case of failure to validate the signature, the message manager 120 may estimate that the emergency message is false and may optionally compute a low score for it.

In another example, the message manager 120 may validate the emergency message based on one or more other emergency messages. For example, assuming the emergency message is received from a wearable IoT device 102 worn by the associated user 104. Further assuming that based on analysis of the geolocation information extracted from the emergency message, the message manager 120 determines that the wearable IoT device 102 is located in a residential house of the associated user 104 where one or more other IoT devices 102 may be deployed and thus capable of capturing the emergency event. In such case, the message manager 120 may try to correlate the emergency message with one or more other emergency messages received from one or more of the other IoT device(s) 102 deployed in the residential house. In case of successful correlation, the message manager 120 may determine and/or estimate that the emergency message is genuine and may optionally compute a high score for it. However, in case the message manager 120 fails to correlate the emergency message with other emergency messages, the message manager 120 may estimate that the emergency message is false and may optionally compute a low score for it.

In another example, the message manager 120 may validate the emergency message based on its content. For example, assuming the emergency message comprises one or more images and/or voice samples of the associated user 104. In such case, the message manager 120 may attempt to recognize the associated user 104 based on one or more reference images and/or reference voice samples retrieved, for example, from an account of the associated user 104. In case the message manager 120 estimates with high confidence that the image(s) and/or voice sample(s) are genuine, the message manager 120 may determine and/or predict that the emergency message is genuine and may optionally compute a high score for it. However, in case the message manager 120 is unable to recognize the associated 104 with sufficient confidence, the message manager 120 may estimate that the emergency message is false and may optionally compute a low score for it.

In another example, the message manager 120 may validate the emergency message based on historical and/or previous information relating to the IoT device 102 and/or to the associated user 104. For example, assuming that based on analysis of the geolocation information extracted from the emergency message, the message manager 120 determines that the wearable IoT device 102 is located in first (geographical) location. Further assuming that based on one or more historical records, the message manager 120 identifies that the IoT device 102 was located at a second location at a certain time period ago. The message manager 120 may compute a distance between the first and second locations and may estimate whether it is possible, feasible and/or likely that the IoT device 102 moved from the first location to the second location with the certain time period. In case of the message manager 120 estimates that it is possible or likely that the IoT device 102 moved from the first location to the second location with the certain time period, the message manager 120 may determine and/or estimate that the emergency message is genuine and may optionally compute a high score for it. Otherwise, the message manager 120 may estimate that the emergency message is false and may optionally compute a low score for it.

Optionally, the message manager 120 may apply one or more ML models which are trained to evaluate, estimate and/or predict if the emergency message is genuine. The ML model(s), for example, a neural network a Support Vector Machine (SVM) and/or the like may be trained to learn and/or identify patterns of the IoT device 102 and/or of the associated user 104 and optionally compute accordingly the score indicative of genuineness of the emergency messages For example, the ML model(s) may be trained to learn location patterns of the IoT device 102 and/or of the associated user 104, for example, typical locations where the IoT device 102 is located, optionally with time tags such that the IoT device 102 may be mapped spatially in space and/or temporarily in time. In another example, the ML model(s) may be trained to learn mobility patterns of the associated user 104 and hence of the IoT device 102, for example, a route, a path, a trip duration, a trip timing (e.g. start, end, etc.). In another example, the ML model(s) may be trained to learn timing patterns the IoT device 102 and/or of the associated user 104, for example, wake hours, sleep hours, time and/or duration of one or more activities the associated user 104 practices and/or participates (e.g. working hours, sport routine, reading time, etc.) and/or the like. In another example, the ML model(s) may be trained to learn one or more physical attributes of the associated user 104, for example, face pattern, iris pattern, voice pattern and/or the like.

The ML model(s) may include one or more supervised models, semi-supervised models and/or unsupervised models and may trained accordingly in one or more training session using one or more training data sets comprising training samples selected according to the type of the ML model(s) as well as according to the learned patterns. For example, in case of supervised ML model(s), the training samples may be labeled. However, in case of unsupervised ML model(s), the training samples may not be labeled. With respect to the learned patterns, the ML model(s) may be trained using training samples which may define, depicting, represent and/or express the target learned patterns, for example, location, mobility and/or timing patterns captured for the IoT device 102 and/or for the associated user 104 over one or more time periods, physical attributes of the associated user 104 and/or the like.

As shown at 406, the message manager 120 may transmit the emergency message to the phone call server 110.

Moreover, in case the message manager 120 analyzes the emergency message to estimate, predict and/or determine its genuineness, the message manager 120 may transmit the emergency message to the phone call server 110 in case the emergency message is determined to be genuine. Furthermore, in case a score was computed for the emergency message to indicate its genuineness, the message manager 120 may transmit (forward) the emergency message to the phone call server 110 in case the score exceeds a certain predefined threshold value.

Optionally, the message manager 120 may be further configured to include in the emergency message one or more of the event attributes, in particular event attributes relating to the associated user 104, for example, for example, an age, medical condition, known health issues, blood type, physical dimensions (e.g., weight, height, etc.) and/or the like extracted from an account of the associated user 104. To this end, the message manager 120 may extract the user identifier of the associated user 104 from the emergency message and access one or more records, for example, a database and/or the like storing accounts of all users 104 to fetch the event attributes relating to the user 104.

Optionally, the message manager 120 may be further configured to include in the emergency message one or more hyperlinks pointing to one or more network resources connected to the network 106 which may store and/or provide additional event data relating to the emergency event reported by the emergency message. The additional event data may include one or more of the data items included in the emergency message by the IoT device 102 and/or by one or more other IoT devices 102 present at the scene of the emergency event.

Optionally, the message manager 120 may be further configured to adjust the emergency message, for example, remove one or more of the event attributes, remove one or more of the data items and/or the like.

In case of the deployment described in FIG. 1B, the call forwarding engine 142 message manager 120 may transmit the emergency message to one or more of the monitoring server(s) 140 deployed in one or more of the monitoring center(s). In such case, a message forwarding engine such as the message forwarding engine 142 executed by the monitoring server(s) 140 may forward the received emergency message to the phone call server 110.

Optionally, one or more human users, operators, dispatchers and/or the like stationed at the monitoring center may validate the emergency message received from the message manager 120.

Moreover, one more automated tools, models, algorithms and/or the like may be optionally applied by the monitoring server 140 to determine, estimate and/or predict whether the emergency message is genuine as described in step 404 of the process 400. Optionally, a score may be computed for the emergency message at the monitoring server 140 to indicate its genuineness optionally using one or more of the ML models.

In such case, the message forwarding engine 142 may forward the received emergency message to the phone call server 110 in case the emergency message is determined to be genuine as described in step 404 of the process 400, for example, the score computed for the emergency message exceeds the predefined threshold level. Otherwise the received emergency message may be discarded.

Optionally, the message forwarding engine 142 may be further configured to include in the emergency message one or more of the event attributes, in particular the event attributes relating to the associated user 104. The message forwarding engine 142 may be also optionally configured to include in the emergency message one or more hyperlinks pointing to one or more network resources connected to the network 106 which may comprise additional event data relating to the emergency event reported by the emergency message. Optionally, the message forwarding engine 142 may be also configured to adjust the emergency message, for example, remove one or more of the event attributes, remove one or more of the data items and/or the like.

As shown at 412, the process 410 starts with the phone call server 110, specifically the call engine 122 receiving the emergency message from the IoT server 108. Optionally, in case of the deployment of FIG. 1B the call engine 122 may receive the emergency message from one of the monitoring server(s) 140.

As shown at 414, the call engine 122 may extract the location of the IoT device 102 included in the emergency message which as described herein before, may be the location of the associated user 104 and/or the location of a site, property and/or the like related to the associated user 104.

Optionally, the call engine 122 may further extract one or more of the additional event attributes and/or hyperlinks if included in the emergency message.

As shown at 416, the call engine 122 may adjust one or more call routing tables such as the call routing table 116, for example, the ANI/ALI database used by the PSTN 112 to route phone calls.

In particular, the call engine 122 may adjust the call routing table(s) 116 to associate a certain caller ID of an emergency call to be initiated from the phone call server 110 to the PSTN with the location of the IoT device 102 extracted from the emergency message. The certain caller ID identifying the location from where the emergency call is initiated may include, for example, an area code, a phone number indicative of a geographical region from where the emergency call is initiated and/or the like. For example, the call engine 122 may adjust the call routing table(s) 116 to associate the certain caller ID with an area code of the geographical area comprising the location of the IoT device 102. In another example, the call engine 122 may adjust the call routing table(s) 116 to associate the certain caller ID with a number typical to the geographical region in which the IoT device 102 is located.

Optionally, the call engine 122 may derive the certain caller ID from one or more identifiers relating to the associated user 104 which are extracted from the emergency message. For example, assuming the emergency message originates from a certain IoT device 102 statically deployed in the residence of the associated user 104. Further assuming that during analysis of the emergency message, the message manager 120 identifies the IoT device 102 according to its identifier included in the emergency message. The message manager 120 may further correlate the certain IoT device 102 with an associated user 104 and may add to the emergency message one or more identifiers relating to the associated user 104 which may be retrieved from the account of the associated user 104, for example, residence address, area code, landline caller ID (landline phone number) and/or the like. In such case, the call engine 122 may extract the identifiers relating to the associated user 104 and may select and/or derive the certain caller ID based and/or according to the identifier(s) relating to the associated user 104 included in the emergency message, for example, the area code.

Optionally, the call engine 122 may adjust the call routing table(s) 116 to further associate the certain caller ID with one or more of the additional event attributes and/or hyperlinks if available.

As shown at 418, the call server 110 may instruct and/or operate the phone call server 110 to initiate the emergency call to the PSTN 112 using the certain caller ID such that the PSTN 112 identifies the incoming emergency call by the certain caller ID.

The emergency call may be identified as such by its destination number which may be directed to one of a plurality of call centers, a dispatch center, a PSAP and/or the like collectively designated PSAP such as the PSAPs 114 which may be distributed in a plurality of geographical areas and regions.

The emergency call may be a regular voice phone call initiated using one or more text to voice and/or data to voice tools, methods and/or algorithms as known in the art. However, the emergency call may comprise text transmitted to the PSTN 112 according to one or more protocol defining transmittal of text via voice lines, for example, Teleprinter or teletype (TTY), Real-Time Text (RTT) and/or the like.

When receiving the incoming emergency call from the phone call server 110, the PSTN 112 may identify the emergency call by its certain caller ID and may access the call routing table(s) 116 to determine the location of the origin of the emergency call. Since the adjusted call routing table(s) 116 associates the certain caller ID with the location of the IoT device 102, the location of origin of the emergency determined by the PSTN 112 is actually the location of the IoT device 102.

The PSTN 112 identifying that the incoming call is an emergency call (by its destination number) may therefore route the emergency call to one of the PSAPs 114 according to one or more call routing protocols as known in the art, for example, calling an emergency line (e.g. 911 in the US, 112 in Europe). In particular, since the location of origin of the emergency call determined by the PSTN 112 is the location of the IoT device 102, the PSTN 112 may route the emergency call to a selected one of the PSAPs 114 which is nearest to the location of the IoT device 102, i.e. the PSAP 114 from which a distance to the IoT device 102 is the shortest among all PSAPs 114.

Optionally, the PSTN 112 includes in the emergency call to the selected PSAP 114 one or more of the event attributes and/or hyperlinks if available in the call routing table(s) 116 and associated with the certain caller ID.

One or more human and/or automated dispatchers of the selected PSAP 114 may respond to the emergency call. Since the selected nearby PSAP 114 is the one nearest to the IoT device 102, the response may be most efficient, for example, shortest response time, increased availability of emergency forces and/or the like.

Optionally, in case one or more of the event attributes as included in the emergency call, the dispatchers at the selected PSAP 114 may use the additional information provided by the event attributes to better understand and comprehend the emergency event and the scene reported by the emergency call. Handling and/or responding of the dispatcher(s) to the emergency call may be therefore significantly improved, for example, efficiency, latency, accuracy, quality and/or the like. For example, based on the event attributes extracted from the emergency call, the dispatcher(s) at the selected PSAP 114 may understand what is type of the emergency event (e.g. violence, car accident, medical situation, etc.). In another example, the dispatcher(s) may determine an exact geolocation of the IoT device 102 and thus of the location of the emergency event scene. In another example, the dispatcher(s) may identify who is the associated user(s) 104 involved in the emergency event, what is his personal and/or medical status and/or the like.

Optionally, the dispatcher(s) at the selected PSAP 114 may use one or more of the hyperlink(s) included in the emergency call to retrieve the additional data from one or more of the network resources, for example, the geolocation of the IoT device 102, the image(s) captured by the IoT device 102, the video sequence(s) captured by the IoT device 102, the audio clip(s) captured by the IoT device 102, the vital signs reading(s) captured by the IoT device 102, the message(s) created by the associated user 104 and/or the like.

Providing and presenting the additional data relating to the emergency event may further enrich the overall view of the emergency event and/or scene by the dispatcher(s) at the selected PSAP 114 which may further improve the handling and/or the response to emergency call corresponding to the emergency message originally transmitted by the originating IoT device 102.

Figure 5:
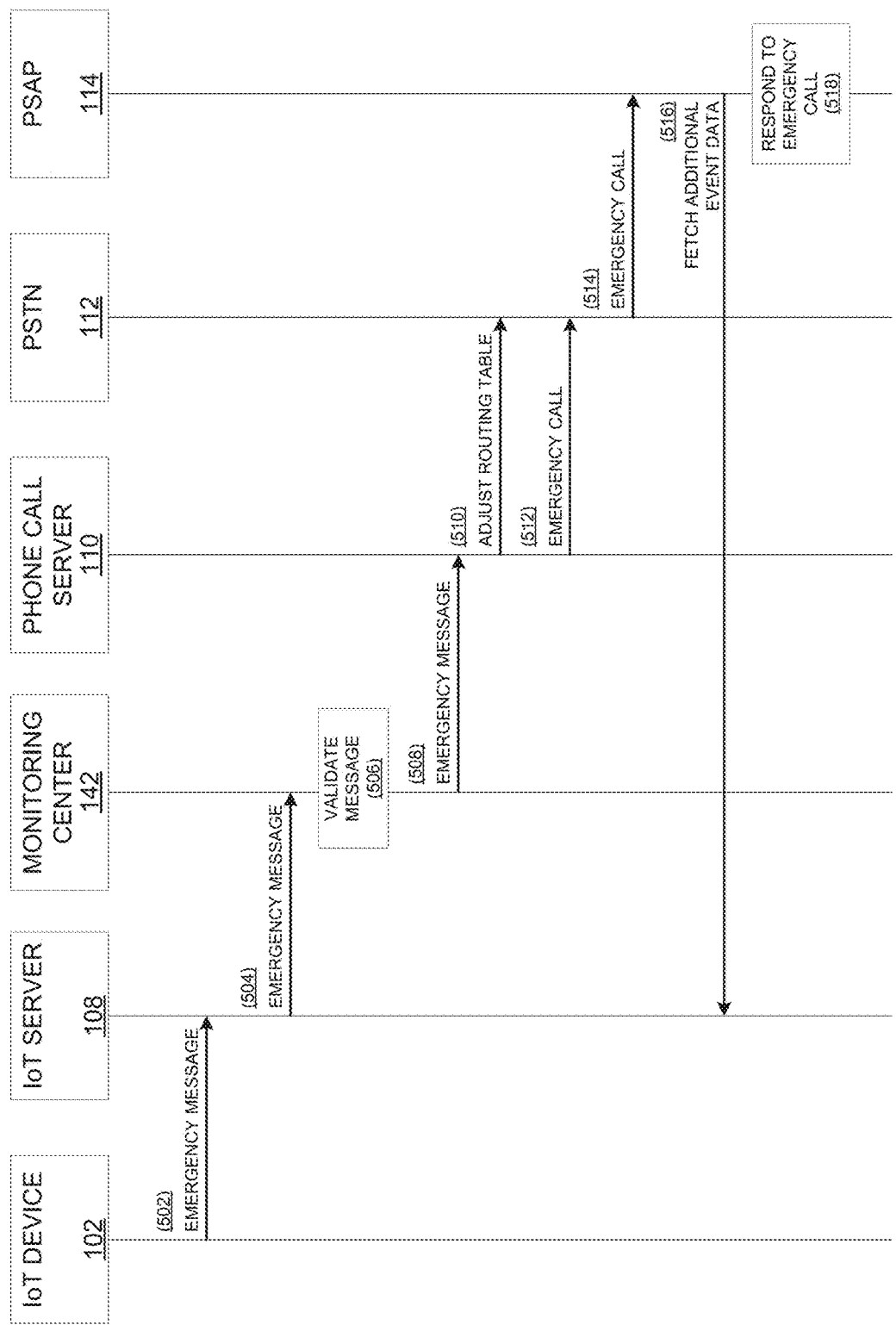
FIG. 5 is a schematic illustration of an exemplary flow of forwarding emergency messages originating from IoT devices to nearby PSAPs, according to some embodiments of the present invention.

Reference is now made to FIG. 5, which is a schematic illustration of an exemplary flow of forwarding emergency messages originating from IoT devices to nearby PSAPs, according to some embodiments of the present invention.

An exemplary flow 500 following the processes 400 and 410 describes a flow of an emergency message originating from an originating IoT device such as the IoT device 102 to a PSAP such as the PSAP 114, in particular, a nearby PSAP 114 which is physically and geographically nearest to the location of the originating IoT device 102 from where the emergency message is transmitted. In particular, the flow 500 is described for the deployment described in FIG. 1B where the emergency message may be routed via a monitoring center such as the monitoring center 140.

As seen, the originating IoT device 102 may transmit the emergency message to indicate an emergency event involving a user such as the user 104 associated with the originating IoT device 102. The IoT device 102 may transmit (502) the emergency message to an IoT server such as the IoT server 108 which transmit (504) the emergency message to the monitoring center 140. The monitoring center 140 may optionally validate the emergency message (506) before transmitting (508) it to a phone call server such as the phone call server 110.

The phone call server 110 may adjust (510) one or more of the call routing tables used by a PSN such as the PSTN 112 to associate a certain caller ID with the location (geolocation) of the IoT device 102 which may be extracted from the emergency message. The phone call server 110 may then initiate (512) an emergency phone call to the PSTN 112 using the certain caller ID.

The PSTN 112 configured to route the incoming emergency call according to information retrieved from the call routing table(s) may identify the location of the IoT device 102 as the location of origin of the emergency call as indicated by the adjusted call routing table(s). The PSTN 112 may therefore route (514) the emergency call accordingly to one of the plurality of PSAPs selected according to its geographical location which is nearest to the location of the IoT device 102.

One or more dispatchers at the selected PSAP 114 may optionally retrieve (516) additional event information from one or more remote network resources, for example, the IoT server 108 using one or more hyperlinks included in the emergency message and may handle and/or respond to the emergency call (518) accordingly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms IoT device, ML models, call routing records and call routing protocols are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for routing emergency events reported by internet of things (IoT) devices to nearby public safety answering points (PSAPs), comprising:
    an IoT server configured to receive, via at least one network, a plurality of emergency messages from a plurality of IoT devices each associated with a user which are distributed in a plurality of geographical regions; and
    a phone call server configured for:
        receiving, via at least one network, at least one emergency message from the IoT server, the at least one emergency message originating from at least one of the plurality of IoT devices is indicative of an emergency event relating to the associated user and comprises at least a location of the at least one IoT device,
        adjusting at least one call routing record used by a public switched telephone network (PSTN) to associate a certain caller ID with the location of the at least one IoT device extracted from the at least one emergency message, and
        initiating an emergency call to the PSTN using the certain caller ID;
    wherein the PSTN forwards the emergency call to a PSAP located in one of the plurality of geographical regions nearest to the location of the IoT device determined based on its association with the certain caller ID in the at least one adjusted call routing record;
    wherein the system further comprises a message forwarding engine deployed in at least one monitoring server configured to receive and analyze data received from at least some of the plurality of IoT devices, the message forwarding engine which is communicatively coupled to the IoT server and to the phone call server via at least one network is configured to transmit each emergency message received from the IoT server to the phone call server;
    wherein the message forwarding engine is further configured to:
        apply at least one ML model trained to compute a score indicative of genuineness of the at least one emergency message, and
        forward the at least one emergency message to the phone call server in case the score exceeds a predefined threshold.

2. A system for routing emergency events reported by internet of things (IoT) devices to nearby public safety answering points (PSAPs), comprising:
    an IoT server configured to receive, via at least one network, a plurality of emergency messages from a plurality of IoT devices each associated with a user which are distributed in a plurality of geographical regions; and
    a phone call server configured for:
        receiving, via at least one network, at least one emergency message from the IoT server, the at least one emergency message originating from at least one of the plurality of IoT devices is indicative of an emergency event relating to the associated user and comprises at least a location of the at least one IoT device,
        adjusting at least one call routing record used by a public switched telephone network (PSTN) to associate a certain caller ID with the location of the at least one IoT device extracted from the at least one emergency message, and
        initiating an emergency call to the PSTN using the certain caller ID;
    wherein the PSTN forwards the emergency call to a PSAP located in one of the plurality of geographical regions nearest to the location of the IoT device determined based on its association with the certain caller ID in the at least one adjusted call routing record;
    wherein the IoT server is further configured to:
        apply at least one ML model trained to compute a score indicative of genuineness of the at least one emergency message, and
        transmit the at least one emergency message to the phone call server in case the score exceeds a predefined threshold.

3. The system of claim 2, further comprising a message forwarding engine deployed in at least one monitoring server configured to receive and analyze data received from at least some of the plurality of IoT devices, the message forwarding engine which is communicatively coupled to the IoT server and to the phone call server via at least one network is configured to transmit each emergency message received from the IoT server to the phone call server.

4. The system of claim 2, further comprising the IoT server receives the at least one emergency message from at least one other $3^{rd}$ party IoT server configured to receive at least one of the plurality of emergency messages received from at least one of the IoT devices and transmit at least one of the at least some emergency messages to the IoT server.

5. The system of claim 2, further comprising the phone call server is integrated with the IoT server.

6. The system of claim 2, further comprising the certain caller ID is derived from at least one identifier relating to the associated user which is included in the at least one emergency message.

7. The system of claim 2, wherein the at least one call routing record comprises at least one Automatic Number Identifier (ANI)/Automatic Location Identification (ALI) database.

8. The system of claim 2, wherein the emergency call is a voice call.

9. The system of claim 2, wherein the emergency call further comprises text transmitted to the PSTN according to at least one protocol defining transmittal of text via voice lines.

10. The system of claim 2, wherein the at least one emergency message further comprises at least one event attribute descriptive of the emergency event.

11. The system of claim 10, wherein the at least one event attribute is included in the at least one emergency message by the IoT server.

12. The system of claim 10, wherein the phone call server is further configured to adjust the at least one call routing record to associate the certain caller ID with the at least one event attribute included in the at least one emergency message, wherein while forwarding the emergency call to the PSAP, the PSTN further transmits to the PSAP the at least one event attribute extracted from the at least one call routing record.

13. The system of claim 2, wherein the IoT server is further configured to include in the at least one emergency message at least one hyperlink pointing to at least one network resource comprising additional event data relating to the emergency event, the phone call server is further configured to adjust the at least one call routing record to associate the certain caller ID with the at least one hyperlink such that the PSTN transmits to the PSAP the at least one hyperlink extracted from the at least one call routing record, the at least one hyperlink is used at the PSAP to connect to the at least one network resource in order to retrieve the additional event data.

14. The system of claim 13, wherein the additional event data comprises at least one data item which is a member of group consisting of: a geolocation of the at least one IoT device, an image captured by the at least one IoT device, a video sequence captured by the at least one IoT device, an audio clip captured by the at least one IoT device, at least one vital sign reading of the associated user captured by the at least one IoT device and a message generated by the associated user.

15. The system of claim 2, wherein each of the plurality of IoT devices is a member of a group consisting of: a client device of the associated user, a wearable IoT device wearable by the associated user, a vehicular IoT device deployed in a vehicle used by the by the associated user, and an IoT device deployed in a site associated with the associated user.

* * * * *